Figure 1:
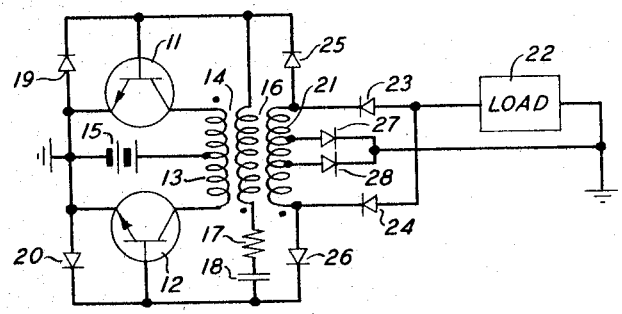

Jan. 10, 1967 R. P. MASSEY 3,297,934
CURRENT FEEDBACK CONVERTER WITH AUTOMATIC
OVERLOAD PROTECTION
Filed Sept. 16, 1963

INVENTOR
R. P. MASSEY
BY
*R. B. Andis*
ATTORNEY

United States Patent Office

3,297,934
Patented Jan. 10, 1967

3,297,934
CURRENT FEEDBACK CONVERTER WITH AUTOMATIC OVERLOAD PROTECTION
Richard P. Massey, Westfield, N.J., assignor to Bell Telephone Laboratories, Incorporated, New York, N.Y., a corporation of New York
Filed Sept. 16, 1963, Ser. No. 309,348
5 Claims. (Cl. 321—2)

This invention relates generally to direct-current converters and more particularly, although in its broader aspects not exclusively, to transistor direct-current converters intended for use in supplying widely variable loads.

In the electrical power supply art, a direct-current converter is a circuit for transforming a direct current at one voltage level into a direct current at another voltage level. Normally, it includes an inverter, which changes the direct current to alternating current, a transformer, which may be part of the inverter, and a rectifier, which changes the alternating current back to direct current. The inverter is typically a free-running vacuum tube or transistor oscillator which relies upon positive feedback to keep itself in operation. Voltage feedback is generally employed when the converter is to supply nothing but relatively heavy loads because of its efficiency under such operating conditions and has the additional advantage of providing automatic overload protection. Current feedback, on the other hand, is more efficient when the converter is to supply light as well as heavy loads but lacks the advantage of affording automatic protection against overload.

Automatic overload protection is particularly desirable in transistor direct-current converters since a transistor can be damaged during overload conditions more quickly than such protection devices as fuses can operate. From a protection standpoint it would, therefore, be desirable to employ voltage feedback even in converters where variable load requirements otherwise indicate the use of current feedback. When voltage and current feedback are employed together, however, the current feedback overrides the voltage feedback during overload conditions and any automatic overload protection afforded by the latter is lost. In the past, therefore, it has been necessary either to forego the advantages of current feedback in transistor direct-current converters intended for use in supplying widely variable loads or to accept the risk of transistor damage during conditions of momentary overload.

An object of the present invention is to obtain the advantages of both voltage and current feedback in a single direct-current converter in as simple a manner as possible.

A related object is to gain operating efficiency at light loads in a direct-current converter without sacrificing the automatic protection against overload provided by positive voltage feedback.

In accordance with the invention, the automatic overload protection advantages of positive voltage feedback are retained in a direct-current converter with positive current feedback by disabling the current feedback path whenever the load current supplied by the converter exceeds a predetermined threshold value. Since the voltage feedback is overridden by the current feedback at light loads, the converter retains the efficiency advantage of current feedback. When the load current approaches the overload point, however, the disabling of the current feedback path permits the voltage feedback path to become effective and the automatic overload protection inherent in voltage feedback is obtained.

In at least one important embodiment of the invention, the positive current feedback path in a direct-current converter is disabled by a pair of semiconductor diodes connected between the inveter transformer and the load to divert current from the positive current feedback path after the load current has exceeded the threshold value. In that embodiment, a pair of transistor switches are connected to pass current from a direct-current source through the primary winding of the transformer alternately in opposite directions, one secondary winding of the transformer provides positive voltage feedback to both transistor switches, and another secondary winding of the same transformer serves both to supply output current through a rectifier to the load and to provide positive current feedback to both transistor switches. The added diodes featured by the invention are connected from spaced intermediate points on the current feedback winding to the load and become forward biased at the moment the load current exceeds the threshold value and operate to disable the positive current feedback path.

Figure 2:
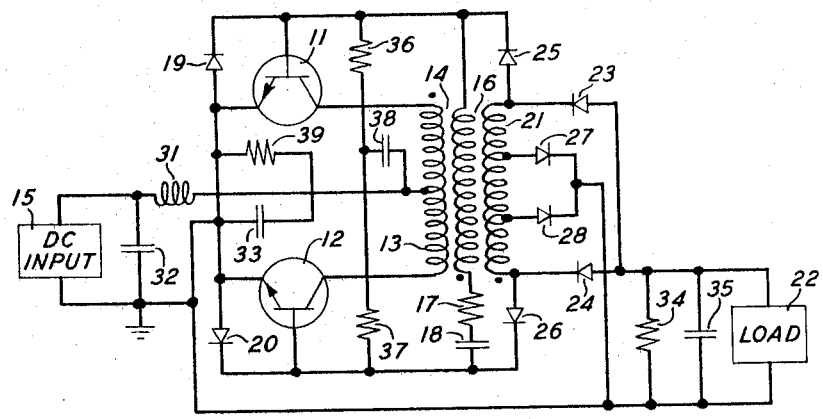

A more complete understanding of the invention may be obtained from a study of the following detailed description of several illustrative embodiments. In the drawing:

FIG. 1 is a schematic diagram of a simplified direct-current converter embodying the invention; and FIG. 2 is a schematic diagram of a somewhat more elaborate version of the embodiment shown in FIG. 1.

In the embodiment of the invention illustrated in FIG. 1, a pair of n-p-n transistors 11 and 12 have their emitters grounded and their collectors connected together through the primary winding 13 of a saturable core transformer 14. A positive direct voltage source, conventionally represented by a battery 15, is connected from ground to the midpoint of primary winding 13. Along with transformer 14, transistors 11 and 12 are the basic elements of an inverter or oscillator. Transistors 11 and 12 are switches, which conduct in alternation and pass current from source 15 through primary winding 13 alternately in opposite directions. Oscillations are sustained by positive feedback to the respective bases of transistors 11 and 12 from secondary windings of transformer 14.

Voltage feedback in FIG. 1 is provided from a secondary winding 16 of transformer 14. As illustrated, a timing resistor 17 and a timing capacitor 18 are connected in series with secondary winding 16 and the combination is connected between the bases of transistors 11 and 12. Primary winding 13 and secondary winding 16 are oppositely poled, as indicated by the dots. Return current paths are provided by a pair of diodes 19 and 20 connected between the respective emitters and bases of transistors 11 and 12. As illustrated, each diode is poled from its respective transistor emitter toward its respective transistor base.

Current feedback in FIG. 1 is provided from a secondary winding 21 which serves also as an output winding. Winding 21 is oppositely poled from primary winding 13 and supplies a load 22 through a full-wave rectifier composed of a pair of diodes 23 and 24. Diodes 23 and 24 are connected from opposite ends of winding 21 to one side of load 22 and are both poled for easy current flow from load 22 toward winding 21. The other side of load 22 is grounded. The current feedback paths are completed by a second pair of diodes 25 and 26, each connected from one end of winding 21 to the base of a respective one of transistors 11 and 12. Diodes 25 and 26 are both poled toward their respective transistors. Finally, in accordance with the invention, a third pair of diodes 27 and 28 are connected from spaced intermediate points on winding 21 to the grounded side of load 22. Both diodes 27 and 28 are poled from winding 21 toward ground.

When the direct-current converter illustrated in FIG. 1 is operating, transistors 11 and 12 conduct alternately.

While transistor 11 is conducting, current from source 15 flows through its collector-emitter path and passes through the upper half of primary winding 13 in the direction toward the dot. Since the collector-emitter path of transistor 11 is essentially a short circuit, the dotted end of primary winding 13 is negative with respect to the midpoint. At that instant of time the voltages induced on secondary windings 16 and 21 are also negative at the dots. The voltage across winding 16 drives transistor 11 further into conduction by causing driving current to flow into the base of transistor 11 and out of the emitter of that transistor, through diode 20, and back through timing capacitor 18 and timing resistor 17. Transistor 12 is held in its nonconducting state by the voltage drop across diode 20. As timing capacitor 18 charges, such current diminishes until it is no longer sufficient to hold transistor 11 in its conducting state, at which time transistor 11 switches to its nonconducting state and transistor 12 switches into its conducting state. As soon as transistor 12 begins to conduct, current from source 15 begins to flow through the lower half of primary winding 13 in the direction away from the dot. The voltage on primary winding 13 is reversed, with the dotted end of the winding positive. The voltages on secondary windings 16 and 21 also reverse and become positive at the dots. The voltage across winding 16 drives transistor 12 further into conduction by causing driving current to flow through timing resistor 17 and timing capacitor 18 into the base and out of the emitter of transistor 12, and back through diode 19. Transistor 11 is held in its nonconducting state by the voltage drop across diode 19. As timing capacitor 18 charges, this base driving current diminishes until it no longer holds transistor 12 in its conducting state. Transistor 12 then switches back to its nonconducting state, transistor 11 switches into its conducting state, and the cycle repeats.

Current feedback is applied to transistors 11 and 12 in FIG. 1 from secondary winding 21. While transistor 11 is conducting, driving current flows from the end of secondary winding 21 remote from the dot, through diode 25 and the base-emitter path of transistor 11 to ground, and back through load 22 and diode 24 to the dotted end of winding 21. While transistor 12 is conducting, the flow of driving current is from the dotted end of winding 21 through diode 26 and the base-emitter path of transistor 12 to ground, and back through load 22 and diode 23 to the end of winding 21 remote from the dot.

As has already been pointed out, the voltage feedback from secondary winding 16 would be the most advantageous form of feedback if load 22 were relatively constant and drew consistently heavy currents. Voltage feedback is efficient at heavy loads and, because the voltage fed back decreases as load current increases, provides automatic overload protection. Such protection is highly desirable as even momentary overloads can cause permanent damage to transistors 11 and 12 before such protection devices as fuses can operate. Unfortunately, feedback is inefficient at light loads. When the load current is small, the voltage fed back is large, causing transistors 11 and 12 to be driven heavily.

Use of current feedback in addition to voltage feedback would solve the problem if it were not for the fact that current feedback would override the voltage feedback during overload conditions and the automatic overload protection provided by the voltage feedback would be lost. Current feedback is relatively efficient at all loads for the reason that the transistor driving currents are proportional to load current.

The present invention permits the advantages of voltage and current feedback to be combined in a single direct-current converter. The light-load operating efficiency afforded by positive current feedback is gained without sacrificing the automatic overload protection provided by positive voltage feedback. In accordance with the invention, diodes 27 and 28 disable the current feedback paths in FIG. 1 as soon as the load current reaches a predetermined threshold value set by their positions on winding 21. For light loads, current feedback predominates and the high efficiency of current feedback is retained. For heavy loads, the converter functions solely as a voltage feedback converter and automatic overload protection is retained.

At light loads, both diodes 27 and 28 in the embodiment of the invention illustrated in FIG. 1 are reverse biased. While transistor 11 is conducting, the voltage across secondary winding 21 of transformer 14 is negative at the dot. The voltage drop across load 22 is relatively large and, as a result, the potential at the dotted end of winding 21 has a large negative value. At the same time, the other end of winding 21 is somewhat positive. Under such conditions, the anode terminals of diodes 27 and 28, which are connected to intermediate points on winding 21, are negative with respect to their grounded cathode terminals and the current feedback paths of the converter function normally. While transistor 12 is conducting, the operation is similar except that the polarity of the voltage on winding 21 is reversed.

At heavy loads, on the other hand, either diode 27 or diode 28 becomes forward biased, depending upon which of the transistors is conducting. When transistor 11 is conducting, the voltage across secondary winding 21 is still negative at the dot but, since the voltage drop across load 22 at heavy loads is small, the potential at the dotted end of winding 21 is much less negative. The potential at the anode terminal of diode 27 is now positive and diode 27 conducts, diverting current away from feedback diode 25 directly to the grounded terminal of load 22 and disabling the positive current feedback path to the base of transistor 11. While transistor 12 is conducting, the operation is the same except that it is diode 28 which is forward biased and begins to conduct, diverting current away from feedback diode 26 and disabling the positive current feedback path to the base of transistor 12. In both instances, the disabling of the current feedback path takes place at the moment the voltage across winding 21 drops sufficiently to enable the current-diverting diode to conduct.

FIG. 2 illustrates a somewhat more elaborate version of the embodiment of the invention shown in FIG. 1. All of the components contained in the converter shown in FIG. 1 appear again in FIG. 2 bearing the same reference numerals. Direct-current source 15 is shown as a box in FIG. 2 rather than as a battery to suggest that it may in fact be a source of rectified alternating current and is followed by an input low-pass filter made up of a series inductor 31 and a pair of shunt capacitors 32 and 33. The principal function of the filter is to minimize noise fed back into input source 15 from the converter. On the output side of the converter, a bleeder resistor 34 is connected across load 22 to minimize any electrical shock hazard on the output if the input power to the converter is disconnected or fails in any manner. An output filter capacitor 35 is also connected across load 22.

In the embodiment of the invention illustrated in FIG. 2, a pair of starting resistors 36 and 37 are connected in series between the bases of transistors 11 and 12. A capacitor 38 is connected from their common point to the midpoint of primary winding 13, which is effectively the positive terminal of direct voltage source 15. Finally, a bleeder resistor 39 is returned to ground from the midpoint of primary winding 13, effectively shunting the input terminals of the converter.

In the embodiment of the invention shown in FIG. 2, capacitor 38 is uncharged when the input voltage from source 15 is first applied. A strong current is thus permitted to flow through resistors 36 and 37, initiating oscillation. Capacitor 38 then charges to the input voltage supplied by source 15 and the starting currents decrease to zero. The addition of bleeder resistor 39 across the input terminals of the converter ensures that oscillation will resume after removal of an overload if input source 15 is disconnected for a short period of time. Addition of bleeder resistor 39 does reduce somewhat the efficiency of the starting network, but it is made large to keep the loss to a minimum. Finally, capacitor 38 and bleeder resistor 39 cooperate to minimize spurious oscillations under overload or short circuit conditions. The current gains of transistors 11 and 12 are minimized under such conditions since they are not biased in the Class A mode.

Regulation of the converter illustrated in FIG. 2 may be accomplished by replacing diodes 23 and 24 with silicon controlled rectifiers and employing standard regulating techniques to control their firing angle. Because the base driving current of transistors 11 and 12 is small at no-load, such regulation tends to be highly efficient.

It is to be understood that the above-described arrangements are illustrative of the application of the principles of the invention. Numerous other arrangements may be devised by those skilled in the art without departing from the spirit and scope of the invention.

What is claimed is:

1. A converter with automatic overload protection which comprises an oscillator having both a positive voltage feedback path and a positive current feedback path, a load, a rectifier connected to supply current from said oscillator to said load, and means to disable said positive current feedback path whenever the current supplied to said load by said rectifier exceeds a predetermined value.

2. A converter with automatic overload protection which comprises a source of direct current, an output transformer having one primary winding and first and second secondary windings, a pair of switches connected to pass current from said source through said primary winding alternately in opposite directions, positive voltage feedback connections from said first secondary winding to both of said switches, a load, a rectifier connecting said second secondary winding to said load, positive current feedback connections from said second secondary winding to both of said switches, and means to open said positive current feedback connections whenever the current supplied to said load exceeds a predetermined value.

3. A converter with automatic overload protection which comprises a source of direct current, an output transformer having one primary winding and first and second secondary windings, a pair of switches connected to pass current from said source through said primary winding alternately in opposite directions, positive voltage feedback connections from opposite ends of said first secondary winding to both of said switches, a load, a full-wave rectifier connecting said second secondary winding to said load, positive current feedback connections from opposite ends of said second secondary winding to both of said switches, each of said positive current feedback connections including a diode, and a pair of additional diodes connected from spaced intermediate points on said second secondary winding to said load to divert current from said feedback diodes and open said positive current feedback connections whenever the current supplied to said load exceeds a predetermined value.

4. A converter with automatic overload protection which comprises a source of direct current, an output transformer having one primary winding and first and second secondary windings, a pair of transistors with their internal emitter-collector paths connected to pass current from said source through said primary winding alternately in opposite directions, positive voltage feedback connections from said first secondary winding to the base electrodes of both of said transistors, a load, a rectifier connecting said second secondary winding to said load, positive current feedback connections from said second secondary winding to the base electrodes of both of said transistors, and means to open said positive current feedback connections whenever the current supplied to said load exceeds a predetermined value.

5. A converter with automatic overload protection which comprises a source of direct current, an output transformer having one primary winding and first and second secondary windings, a pair of transistors with their internal-emitter collector paths connected to pass current from said source through said primary winding alternately in opposite directions, positive voltage feedback connections from opposite ends of said first secondary winding to the base electrodes of both of said transistors, a load, a full-wave rectifier connecting said second secondary winding to said load, positive current feedback connections from opposite ends of said second secondary winding to the base electrodes of both of said transistors, each of said positive current feedback connections including a diode, and a pair of additional diodes connected from spaced intermediate points on said second secondary winding to said load to divert current from said feedback diodes and open said positive current feedback connections whenever the current supplied to said load exceeds a predetermined value.

No references cited.

JOHN F. COUCH, *Primary Examiner.*

W. H. BEHA, JR., *Assistant Examiner.*